… … …

United States Patent Office 3,331,886
Patented July 18, 1967

3,331,886
THERMOSETTABLE COATING COMPRISING (1) AN ORGANIC POLYCARBOXYLIC POLYMERIC MATERIAL AND (2) A RESINOUS POLYEPOXIDE-ALKANOL AMINE ADDUCT
Robert L. Zimmerman, Midland, and Herbert R. Bailey, Saginaw, Mich., assignors to The Dow Chemical Company, Midland, Mich., a corporation of Delaware
No Drawing. Filed Jan. 28, 1963, Ser. No. 254,413
26 Claims. (Cl. 260—835)

This invention appertains to thermosettable coating vehicles. It is particularly concerned with thermosettable coating vehicles comprised of a mixture of (1) a dispersion of an organic, polycarboxylic, polymeric material in a solvent medium and (2) a soluble adduct of an alkanolamine and a low molecular weight polyepoxide resin. The present invention is further concerned with the employment of thermosettable coating vehicles in pigmented, thermosettable coating compositions.

Currently, the art is well advanced in knowledge of the co-reaction of polyepoxide resins with acidic resins, i.e., those having available reactive carboxyl groups, and the thermoset products obtained therefrom. One of the newer specialized areas of research with regard to the co-reaction products of polyepoxide and acidic resins has been the preparation of aqueous dispersions of those polymers to be used in thermosettable coating compositions. In order to form aqueous dispersions containing polyepoxide resins and acidic resins, it is current practice to incorporate a basic reagent, such as ammonia, to solubilize or stabilize the acidic polymer by forming a soluble salt of the acidic or free-carboxyl-containing polymer. Having solubilized the acidic resin, it is then necessary to emulsify the water-insoluble polyepoxide resin in order to reduce it to a form which will disperse in water.

Although it has been possible to prepare thermosettable coating materials by means of the above-described process, those coating materials do not possess one of the most important physical properties of all coating materials, namely, the ability to remain fluid under varied storage conditions for indefinite periods of time. The lack of prolonged fluidity of presently available, water-borne, thermosettable coating compositions based on basic salts of acidic polymers and emulsified polyepoxide resins is disadvantageously caused by the action of a base, such as an amine or an alkali, which catalyzes a reaction between the readily available reactive carboxyl groups and polyepoxide groups of the component polymers at room temperature. As a result, those presently available, water-borne, thermosettable coating compositions, as defined heretofore, are known to solidify or gel to form completely unusable thermoset coating materials in a relatively short time.

In addition, it has long been appreciated that not only water-borne, thermosetting, coating compositions, composed of carboxylic, acid-containing polymers and polyepoxides containing various catalytic curing agents, such as amines, tert.-amine bases, etc., have not been entirely satisfactory due to their limited storage or shelf stability, but, likewise, similarly constituted organic, solvent-borne, thermosetting coating compositions suffer from the same deficiency.

Further, it is recognized that teachings in the art with regard to the employment of volatile alkanolamines as suitable curing agents for epoxide resins are profuse.

Heretofore, however, it was not known that the reaction products of certain alkanolamines and certain epoxide resins provide very useful adduct curing agents which, when admixed with any of a wide variety of organic, polycarboxylic polymers, form highly satisfactory thermosettable coating vehicles having effectively prolonged shelf stability. In addition, the novel, thermosettable, coating vehicles of the present invention are most suitable as resinous binding vehicles into which various inorganic and organic pigments and other additives can be incorporated to produce pigmented, thermosettable, coating compositions, the applied thermoset films of which provide excellent protection to the surfaces of all substrata capable of withstanding the curing temperatures required by such pigmented, thermosettable, coating compositions.

The principal objectives of the present invention is to provide useful, resinous, polyepoxide-alkanolamine adducts possessing the highly desirable characteristics of improved solubility, excellent chemical stability, excellent natural color and clarity and excellent oven stability after prolonged heating at relatively high temperatures.

Another objective of the present invention is to provide water-dilutable, resinous, epoxide-alkanolamine adducts by the reaction of certain low molecular weight epoxide resins with certain alkanolamines.

A further objective of the present invention is the provision of compatible resinous epoxide-alkanolamine adducts that are capable of producing thermosettable coating vehicles in combination with a wide variety of reactive, organic, polycarboxylic, acidic polymers.

An additional beneficial object of the present invention is the provision of such thermosetting coating vehicles having highly satisfactory shelf life, i.e., the characteristic of sustaining the desired liquid state and remaining substantially free of the formation of gelatinous polymeric particles under conditions contingent with normal paint storage situations.

A further objective of the present invention is to provide novel, pigmented, thermosetting, coating compositions based essentially on dispersions of certain resinous polyepoxide-alkanolamine adducts in combination with a wide variety of organic, polycarboxylic polymers, cast films of which become insolubilized by oven curing to give coatings, and particularly primer coatings for structural metals, having generally improved physical properties.

The thermosettable coating vehicles of the present invention are prepared by admixing (1) at least one homogeneous, organic, polycarboxylic, polymeric material having an acid number within the range of from about 20 to about 175, said polymeric material having available therein up to 1 gram equivalent weight, and preferably from 0.1 to 0.5 gram equivalent weight, of at least one reactive carboxylic substituent group per 100 grams of solids of said polymeric material with (2) from 0.2 to 2.0 amine equivalent weights of a soluble, resinous, polyepoxide-alkanolamine adduct for each equivalent weight of said reactive carboxylic substituent group. Preferably, the resinous, polyepoxide-alkanolamine adduct is admixed with said polymeric material on an equivalent weight basis, e.g. one amine equivalent weight of the polyepoxide-alkanolamine adduct to one equivalent weight of the previously mentioned available reactive groups in said polymeric material. By "reactive carboxylic substituent group" is meant heretofore and hereinafter in this application reactive acidic radicals, namely, free-carboxyl radicals, free-carboxyl anions and free-anhydride radicals. For the purposes of this invention, the free-carboxyl radicals and free-carboxyl anions are preferred reactive radicals. Free-anhydride radicals are, likewise, operative to prepare the thermosettable coating vehicles of the invention but due to their rapid gel-forming reaction polymers containing such reactive anhydride radicals are not recommended for general use within the scope of this invention.

The valuable, soluble, resinous, polyepoxide-alkanolamine adducts of the present invention may be prepared by the reaction of from 0.7 to 1.5 mole, and preferably 1.0 mole, of alkanolamine with each equivalent weight of epoxide resin. The alkanolamines that are highly satisfactory for use in preparing the useful, water-dispersible, resinous, polyepoxide-alkanolamine adduct curing agents of the present invention include mono- and dialkanolamines, such as monoethanolamine and diethanolamine. Mono- and diisopropanolamines are considered to be less satisfactory for present purposes except for organic, solvent-soluble coating systems due to the fact that their reactions with certain of the preferred epoxide resins produce less water-soluble adducts.

The epoxide resins which are suitable for reaction with the above-described alkanolamines to produce the novel, resinous, polyepoxide-alkanolamine adducts should have an epoxide equivalent weight of less than 1000, and preferably less than about 500, if employed in organic solvent systems. To produce water-soluble adducts that are entirely compatible with organic, free-carboxyl-containing, polymeric materials in basic aqueous media, the epoxide equivalent weight of the polyepoxide should be less than 250.

While the invention is applicable to epoxides generally within the equivalent weight limits defined heretofore, preferred polyepoxides are glycidyl polyethers of aromatic polyhydric compounds having epoxide equivalent weights of less than 1000. Glycidyl ethers of polyhydric alcohols are also well known. These polyepoxides are made by reacting at least about two mols of an epihalohydrin with one mol of a polyhydric alcohol, such as ethylene glycol, pentaerythritol, etc., followed by dehydrohalogenation according to U.S. Patent 2,581,565.

In addition to polyepoxides made from alcohols or phenols and an epihalohydrin, polyepoxides made by the known peracid method are also suitable. Epoxides of unsaturated esters, polyesters, diolefins, and the like can be prepared by reacting the unsaturated compound with a peracid. The reaction is one of epoxidation of compounds with isolated double bonds, at a temperature sufficiently low so that the acid resulting from the peracid, for example, acetic acid in the case of peracetic acid, does not react with the resulting epoxide group to form hydroxyl groups and ester linkages. Preparation of polyepoxides by the peracid method is described in various periodicals and patents and such compounds as butadiene, cyclic olefins, ethyl linoleate, as well as di- or tri-unsaturated drying oils or drying oil acids, esters and polyesters can all be converted to such polyepoxides.

Epoxidized drying oils are also well known, these polyepoxides usually being prepared by reaction of a peracid, such as peracetic acid or performic acid, with the unsaturated drying oil according to U.S. Patent 2,569,502.

Desirable esters for epoxidation are prepared by reacting unsaturated aldehydes with butadiene to form unsaturated cyclic aldehydes. These can be condensed by the Tischenko reaction to form esters or reduced to form alcohols which can be subsequently reacted with acids to form esters.

In addition to epoxidized drying oils, butadiene dioxide and monomeric esters, polymeric esters can also be epoxidized by the peracid method as described in Australian Patent 11,862, 1955. Examples of these unsaturated polyesters are those made from unsaturated polyhydric alcohols and unsaturated polybasic acids, for example, maleic acid, 2-butenedioic acid, 4-cyclohexene-1,2-dicarboxylic acid, dimerized linoleic acid, etc., and such alcohols as ethylene glycol, 1,6-hexanediol, 3-ethylhexanediol-1,3, pentaerythritol, etc. Other polyesters which can be epoxidized with peracetic or other peracids are made from saturated acids and unsaturated alcohols, for example, 2-butenediol-1,4 1,5-hexanediene-3,4-diol, pentene-1,5-diol, cyclohexenediol-2,5, etc., reacted with such saturated acids or acid anhydrides as malonic, succinic, glutaric, terephthalic, etc.

Examples of such polyepoxides include the diglycidyl ether of diethylene glycol or dipropylene glycol, the diglycidyl ether of polypropylene glycols having molecular weights up to, for example, about 2000, the triglycidyl ether of glycerine, bisphenolic epoxides, epoxy novolacs, glycidyl ethers of cashew nut oil, epoxidized soybean oil, epoxidized unsaturated polyesters, vinyl cyclohexene dioxide, dicyclopentadiene dioxide, dipentene dioxide, epoxidized polybutadiene and epoxidized aldehyde condensates, such as 3,4-epoxy-6-methylcyclohexylmethyl-3,4-epoxy-6-methylcyclohexane carboxylate.

Formulation of solvent-borne compositions of the resinous polyepoxide mono- or dialkanolamine adducts of the invention is typified by the diethanolamine adduct of the diglycidyl ether of 4,4'-isopropylidene diphenol which, at room temperature, is a solid. By heating to about 175° C., the resinous adduct is readily pourable. Excellent thermal stability permits maintaining the resinous adduct at temperatures of from 125° to 200° C. for hours without severe coloration. On long standing at room temperature or more quickly at 60° C., pure samples of the adduct tend to crystallize but remelting can be accomplished readily by heating the same. Further, the resinous adduct can be diluted to concentrations above 50 weight percent solids with water for purposes of fluid handling at room temperature. Other convenient solvents for the resinous adduct of diethanolamine and the diglycidyl ether of 4,4'-isopropylidene diphenol are t-butyl alcohol and n-butyl alcohol. The resin is not soluble when diluted with xylene, methyl ethyl ketone or ethyl acetate. Advantageously, however, the resinous adduct is readily dissolved in dilute aqueous acetic acid and generally is soluble in aqueous and/or non-aqueous solutions of carboxylic polymers and ammonium salts thereof.

The carboxyl-containing, polymerizable, organic monomers which are essential ingredients in the composition of the above-described copolymeric materials employed in making the novel, thermosettable coating vehicles of the present invention may be selected from various types of polymerizable, organic, acidic monomers including ethylenically unsaturated monocarboxylic acids; ethylenically unsaturated polycarboxylic acids, and anhydrides thereof; saturated aliphatic monocarboxylic acids; saturated aliphatic polycarboxylic acids, and anhydrides thereof; as well as various compatible mixtures of the above-mentioned groups of organic acids and/or related anhydrides. More particularly, however, these carboxyl-containing, polymerizable, organic monomers are selected from certain polymerizable α,β-ethylenically unsaturated dicarboxylic acids and partial esters or amides thereof with primary or secondary monoalcohols and primary or secondary monoamines.

Representative members of the above-indicated group of saturated and unsaturated monocarboxylic organic acids, include acrylic-, methacrylic-, ethacrylic-, crotonic-, 3-butenoic-, angelic-, sorbic-unsaturated acids and the like, and formic-, acetic-, propionic-, butyric-, valeric-, caproic-, enanthic-, caprylic-, pelargonic-, capric-, hendecanoic-, lauric-, tridecanoic-, myristic-, pentadecanoic-, palmitic-, margaric-, stearic-saturated acids and the like. These monocarboxylic organic acids are satisfactory carboxyl-containing polymerizable acidic monomers useful as essential ingredients in various vinyl acidic copolymers and alkyd polyesters employed in preparing the thermosettable coating vehicles of the present invention.

Representative members of the above-indicated applicable saturated and unsaturated polycarboxylic organic acids include isomeric phthalic, malonic, methyl malonic, succinic, methyl succinic, sym-dimethyl succinic, unsym-dimethyl succinic, glutaric, adipic, pimelic, suberic, azelaic, sebacic, brassylic, phenyl maleic, benzyl maleic, ethyl maleic, chlor maleic, fumaric, citraconic, mesaconic, itaconic, glutaconic, tricarballylic, aconitic, citric acids and the like. Maleic acid and adipic acid of this group are, however, preferred species. In like manner, these polycarboxylic organic acids are suitable carboxyl-contributing polymerizable monomers for inclusion as essential ingredients in the various vinyl acidic copolymers and alkyd polyesters satisfactorily employed in making the thermosettable coating vehicles of the present invention.

Various anhydride derivatives of saturated and unsaturated polycarboxylic organic acids may be, and frequently are, selected as the carboxyl-contributing member of the vinyl acidic copolymers and alkyd polyester materials employed in achieving this invention. Representative and commonly employed anhydrides used for the above indicated purpose include maleic anhydride, succinic anhydride, citraconic anhydride, itaconic anhydride and phthalic anhydride. Phthalic anhydride is, however, the preferred carboxyl-contributing member for use in forming suitably employed alkyd polyester resins.

Suitable types of monoalcohols for use in the above-described partial esterifications of monoethylenically unsaturated polycarboxylic acids (e.g. maleic acid) may be selected from the group of $C_1$ to $C_{20}$, and preferably $C_6$ to $C_{10}$, primary and secondary monoalcohols. Also applicable are $C_1$ to $C_{20}$, and preferably $C_6$ to $C_{10}$ primary and secondary monoalcohols having from 1 to about 9, and practically 1 to 4 ether oxygen linkages (e.g. alkylene glycol monoether monoalcohols and polyalkylene glycol monoether monoalcohols). All of the foregoing types of monoalcohols should be free of non-aromatic unsaturated and should be substantially free of acetal-type linkages.

Representative of operative primary and secondary monoalcohols useful in partial esterification within the scope defined above are methanol, ethanol, n-propanol, isopropanol, n-butanol, isobutanol, sec.-butanol, hexanol, n-octanol, isooctanol, decyl alcohol, lauryl alcohol, dodecyl alcohol, 2-ethylhexyl alcohol, cetyl alcohol, stearyl alcohol, cyclopentyl alcohol, cyclohexyl alcohol, benzyl alcohol, phenylethyl alcohol, and the like. The practice of the invention contemplates the use of maleic acid partial esters prepared from mixtures of the above-defined primary and secondary monoalcohols.

Ether-containing alcoholic half esters of maleic acid, such as the half ester derivatives of the following types of alkylene and polyalkylene glycol monoalkyl monoether alcohols and monoaryl monoether alcohols, as well as mixtures of these monoether alcohols within the scope set forth above, constitute another particularly advantageously employed group for the aforementioned partial esterification reactions. Representative of the monoether-containing alcoholic half ester components included in this group are ethylene glycol and poly(ethylene glycol) methyl-, ethyl-, n-butyl-, phenyl-, 2-ethylbutyl-, 2-ethylhexyl-, monoether acid maleates and the like; propylene glycol- and poly(propylene glycol)-, methyl-, ethyl-, n-propyl-, isopropyl-, n-butyl-, tert.-butyl-, 2-ethylhexyl-, phenyl-, cyclohexyl-, benzyl-, 2-naphthyl-, monoethers and the like, which acid maleate esters include: 2-phenoxyethyl acid maleate, 2-methoxyethyl acid maleate, 2-ethoxyethyl acid maleate, 2-n-butoxyethyl acid maleate, 2-(2-methoxyethoxy)ethyl acid maleate, 2-(2-ethoxyethoxy)ethyl acid maleate, 2-(2-propoxyethoxy)ethyl acid maleate, 2-(2-n-butoxyethoxy)ethyl acid maleate, dipropylene glycol-, and tripropylene glycol methyl-, ethyl-, propyl-, butyl-, phenyl-, monoether- and the like, acid maleates.

Further, and advantageously, contemplated are partial esters of maleic acid derived from mixtures of alkylene glycol monoethers which are the reaction products of ethylene or propylene oxide or mixtures thereof and a $C_1$ to $C_{18}$ alcohol. These alcohols are mixtures and may be characterized by an average number of oxide units which can be determined by a routine alcohol analysis. Thus, tridecyl alcohol may be reacted with an average of eight moles of ethylene oxide. The product consists substantially of a mixture of polyethylene glycol monotridecyl ether alcohols having from 1 to possibly as high as 15 ethylene oxide units, but predominantly 8 units, and the average of units from an alcohol analysis would lie in the range 7.5–8.5.

Other maleic acid half esters which are useful within the purview of the invention include: cyclopentyl-, cyclohexyl-, tolyl-, xylyl-, monoether acid maleates of polyethylene and polypropylene glycols and the like. Likewise, to be included within the scope of suitable maleic acid half ester alcoholic ester-containing derivatives are ethyl-, propyl-, butyl-, tetraethyl-, dipropyl-, tripropyl-, dibutyl-, di-sec.-butyl-, p-tert.-amyl-, phenyl monoether acid maleates of polyethylene and polypropylene glycols and the like.

By definition, the partial esters of maleic acid, contemplated as suitable copolymerizable monomers for employment of the present invention, constitute maleic acid esterification products containing from 50 to about 120, and preferably from about 75 to about 100, mole percent, wherein 100 mole percent would represent the maleic acid monoesterification product and 200 mole percent represents the maleic acid diesterification product.

The maleic acid half-amides are obtained analogously to the maleic acid half-esters, by reaction of maleic anhydride with the corresponding amines. These, likewise, are satisfactory comonomers for present purposes. Suitable amines are aliphatic, cycloaliphatic, aromatic or heterocyclic amines which may contain up to 18 carbon atoms, preferably dialkylamines having one nitrogen atom with a single reactive hydrogen atom. Examples of such amines are the lower dialkylamines, such as dibutylamine, diisobutylamine, diethylamine and dipropylamine and cyclic alkylamines, such as cyclic hexamethylamine, pyrrolidine or piperidine.

The carboxyl-free polymerizable organic monomers which are useful in the above-described copolymer preparation and which advantageously may constitute a major portion of the instant thermosetting copolymers can be selected from polymerizable saturated and unsaturated hydrocarbon compounds, such as (A) $C_1$ to $C_8$ primary and secondary alkyl esters of acrylic acid including methyl acrylate, ethyl acrylate, propyl- and isopropyl acrylates, butyl-, isobutyl-, and sec.-butyl acrylates, amyl- and isoamyl acrylates, hexyl acrylate, 2-ethylhexyl acrylate, octyl acrylate and the like: (B) $C_1$ to $C_8$ primary and secondary alkyl esters of methacrylic acid, such as methyl-, ethyl-, propyl-, isopropyl-, butyl-, isobutyl-, sec.-butyl-, amyl-, isoamyl-, hexyl-, 2-ethylhexyl, octyl methacrylates and the like; (C) acrylonitrile; (D) methacrylonitrile; (E) open-chain aliphatic conjugated dienes having from 4 to 9 carbon atoms, such as butadiene, 2,3-dimethyl butadiene, isoprene, piperylene and the like; (F) vinyl chloride; (G) vinylidene chloride; (H) vinyl esters of monocarboxylic organic acids having from 2 to 4 carbon atoms in the acid substituent group, such as vinyl acetate, vinyl propionate, vinyl butyrate; (I) various monoalkenyl aromatic hydrocarbons of the benzene series characterized by the general formula:

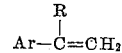

wherein Ar, selected independently, represents an aromatic hydrocarbon and a nuclear halohydrocarbon radical and R is a substituent selected from the group consisting of hydrogen, a $C_1$ to $C_4$ alkyl radical, and a halogen radical having an atomic number of from 17 to 35, inclusively; including styrene, α-methylstyrene, o-methylstyrene, p-methylstyrene, m-methylstyrene, ar-ethylstyrene, propylstyrenes, butylstyrenes, ar-chlorostyrene, ar-bromostyrene and the like; and (J) $C_2$ to $C_{18}$ saturated polyhydric alcohols, such as glycerin, pentaerythritol, sorbitol, mannitol, ethylene glycol, propylene glycol, 1,2-butylene glycol, and the like.

Exemplary of one group of organic, free-carboxyl-containing, acidic, polymeric materials found to be particularly suitable for employment in the preparation of the novel, water-borne, shelf-stable, thermosettable coating vehicles of the invention are aqueous dispersions of certain film-forming, water-insoluble, organic, polymeric latexes composed of (A) from 30 to 60, preferably 52 to 54, weight percent of an alkenyl aromatic monomer of the benzene series, such as styrene, tert.-butylstyrene and the vinyl toluenes; (B) from 30 to 60, preferably about 40, weight percent of an open-chain, aliphatic, conjugated di-olefin containing from 4 to 9 carbon atoms, such as isoprene, piperylene, 2,3-dimethyl butadiene, and the like and particularly 1,3-butadiene; and (C) from 4 to 10, and preferably 6 to 8, weight percent of a monoethylenically unsaturated acid, such as methacrylic acid, ethacrylic and paritcularly acrylic acid.

These latexes may be prepared by known procedures for polymerization in aqueous emulsion. Typically, the monomers are dispersed in an aqueous solution of from about 0.05 to 5 percent of a polymerization catalyst, such as sodium or potassium persulfate, and from about 0.05 to 5 percent of a pH stable surface-active agent capable of emulsifying the monomers. Polymerization is initiated by heating the emulsified mixture usually between 30° to 70° C. and is continued by maintaining the polymerizing emulsion at the selected temperature. After the polymerization has reached the desired conversion of monomer to polymer, the latex is filtered to remove any precoagulum and may be stabilized for storage by the addition of a small amount of known stabilizer, such as ammonium hydroxide.

The ternary interpolymer latexes, thus prepared, may have from about 20 to about 50, and preferably from about 40 to 50, weight percent of polymeric solids and an average particle size of from about 500 to 2500 angstrom units.

Other homogeneous, organic, carboxyl-containing, partial ester-containing polymer materials, prepared in the manner described hereinafter, which are suitably adapted to be combined with resinous, polyepoxide-alkanolamine adducts to prepare the novel, organic, solvent-borne, shelf-stable, thermosetting coating vehicles of the present invention, are certain homogeneous, organic copolymers prepared by copolymerizing (A) from 97 to 65 mole percent, preferably 95 to 80 mole percent, of a vinyl aromatic monomer with (B) correspondingly, from 3 to 35 mole percent, preferably 5 to 20 mole percent, of an alkylene oxide monoether alcohol partial ester of maleic acid or an $\alpha,\beta$-ethylenically unsaturated dicarboxylic acid anhydride which is mono-esterified from 50 to 120 mole percent with a member of the group consisting of primary and secondary alkyl, cycloalkyl and benzenoid aromatic alcohols containing from 1 to 21 carbon atoms and $C_3$ or $C_4$ unsaturated aliphatic primary and secondary alcohols having the —C=C— group at least one carbon removed from the OH. The resultant vinyl aromatic partial ester polymer should preferably have a molecular weight characterized by a 10 percent solution viscosity in methyl ethyl ketone at 25° C. of 0.5 to 20 cps., preferably 0.9 to 10 cps.

These vinyl aromatic half ester copolymers are generally soluble in acetone, alcohol, one percent caustic and xylene. They are generally insoluble in kerosene and of slight solubility in water except for the higher ethylene oxide containing glycol monoether half esters.

The partial ester types of copolymeric materials useful in the organic, solvent-borne, thermosetting coatings of the invention are preferably prepared from the vinyl aromatic monomer and acid maleate by solution polymerization, although bulk, emulsion or suspension polymerization methods may also be employed. Two requirements of the polymerization method are (1) that it results in relatively uniform copolymer composition and (2) that the copolymer be essentially uncrosslinked.

The solution copolymerization is preferably carried out in an aromatic solvent, such as xylene, toluene and the like, or in a ketone, such as methyl ethyl ketone (MEK), methyl isobutyl ketone, etc. In order to achieve adequate copolymer composition homogeneity, it is best to add the acid maleate monomer, admixed with the polymerization catalyst, to a solution of the vinyl aromatic monomer over a period of time corresponding to about 80 percent conversion of the monomers to the copolymer. In some cases, however, satisfactory copolymers have been prepared by mixing all ingredients or by addition of the mixed monomers to the solvent during the polymerization. Solution copolymerization with relatively large amounts of free radical catalysts is usually adequate for preparation of uncrosslinked products.

Solution or bulk copolymerization by a continuous method of feeding the reactants to a well stirred reactor and continuous removal of a monomer-polymer solution gives the desired uniform polymer compositions. The copolymer may be isolated by precipitation in a non-solvent or by devolatilization in some cases. If the conversion in the continuous polymerization is more than about 70 percent, the remaining monomers may be finished off by simple batch polymerization to yield the desired copolymers.

Where crosslinking is a problem, lower polymerization temperatures or higher solvent concentrations will usually prevent gelation. An alternate route, however, is to react a corresponding homogeneous maleic anhydride copolymer, such as is described in the copending application, U.S. Ser. No. 33,376, filed June 2, 1960, by R. L. Zimmerman, with the polyalkylene oxide monoether. This reaction is advantageously carried out in an aromatic or ketonic solvent or solvent blend at about 60° C. and may be speeded by addition of a small amount of an acid catalyst, such as p-toluene sulfonic acid or dry HCl.

Other carboxyl-containing polymers that are suitably operable with the alkanolamine-polyepoxide resinous adducts of the invention may be chosen from alkyd polyester resins having acid numbers within the range of from 20 to 175. Such polyester resins are generally prepared from component polymerizable organic monomers comprised of at least one mole of a polycarboxylic organic acid or an anhydride derivative thereof, and less than (i.e. not in excess of) one mole of a polyhydric alcohol. Commonly, a saturated, monocarboxylic, organic acid may be incorporated together with the polycarboxylic compound to prepare a modified polyester material. The monocarboxylic organic acid is employed in an amount sufficient to esterify any excess available reactive hydroxyl groups of the polyhydric alcohol. The foregoing components are reacted together to produce a polyester material which normally has a low molecular weight. Examples of suitable reactants for preparing these alkyd polyester resins are included heretofore in the instant specification.

Further operable carboxyl-containing, polymeric materials for the purpose of this invention may be alkyd polyester resins having acid numbers of from 20 to 100 which are based on benzene tricarboxylic acids. Such alkyd resins are fully described in U.S. Letters Patent No. 3,067,157 and No. 3,067,158. These alkyd resins are soluble in water containing an alkaline compound.

As is well understood, the acid number of any particular carboxyl-containing, polymeric reaction product is dependent upon the mole ratio of carboxyl-free monomer to carboxyl-containing monomer in the polymerization charge, also to some extent on the particular reactants charged, and also upon the closeness of the approach to complete reaction of the particular carboxyl-contributing member and the carboxyl-free member.

Examples I through V, VIII and XIII, Part B illustrate the preparation of the alkanolamine-polyepoxide resinous adduct curing agents of the present invention, the use of which to prepare thermosettable coatings is well illustrated in the remainder of the examples.

EXAMPLE I

To 18.0 grams of diethanolamine were added with stirring 10.0 grams of diglycidyl ether of 4,4'-isopropylidene diphenol having an epoxide equivalent weight within the range of from 172 to 178. By warming this mixture to a temperature of 150° C. an exothermic reaction occurred. After the reaction mixture had cooled to a temperature of about 165° C. over a period of about 15 minutes, a second 10.0 gram portion of the same diglycidyl ether was added. Thereafter, the reaction mixture was again allowed to cool prior to the addition of a third 10.0 gram portion of the diglycidyl ether. The reaction product, thus obtained, after cooling was observed to be a hard, clear, straw-colored, resinous adduct of diethanolamine and the diglycidyl ether of 4,4'-isopropylidene diphenol. The adduct was found to be soluble in water and it retained its chemical stability when heated at a temperature of 200° C. for several hours without any apparent degradative effect with the exception of a tendency to darken gradually.

EXAMPLE II

To 10.5 grams of ehtanolamine were added with stirring 30.0 grams of the diglycidyl ether of 4,4'-isopropylidene diphenol having an epoxide equivalent weight within the range of from 172 to 178. A vigorous exothermic reaction occurred. Upon cooling of the reaction mixture, the reaction product obtained was a hard, yellow-colored, resinous aduct of ethanolamine and the diglycidyl ether of 4,4'-isopropylidene diphenol. This resinous adduct was, likewise, found to be completely soluble in water.

The following Examples III, IV and V were performed to determine whether the reaction products of other alkanolamines and the same diglycidyl ether of 4,4'-isopropylidene diphenol, as employed in Examples I and II, would produce additional resinous adducts having other beneficial solubility characteristics.

EXAMPLE III

To 13 grams of isopropanolamine were added with stirring 30 grams of the diglycidyl ether of 4,4'-isopropylidene diphenol having an epoxide equivalent weight within the range of from 172 to 178. A vigorous reaction occurred which, after cooling, left a solid, resinous reaction product, the adduct of isopropanolamine and the above-mentioned diglycidyl ether of 4,4'-isopropylidene diphenol. This resinous adduct was found to be insoluble in water.

EXAMPLE IV

Into 23 grams of diisopropanolamine were admixed 30 grams of the same kind of diglycidyl ether as that employed in Example III. A moderate exothermic reaction occurred and subsequently, after cooling, a solid, resinous reaction product, the adduct of diisopropanol and the above-identified diglycidyl ether of 4,4'-isopropylidene diphenol, was obtained. This resinous adduct likewise proved to be insoluble in water.

EXAMPLE V

To 13.3 grams of diisopropanolamine were added with mixing 45.5 grams of a polyglycidyl ether of polymers of 1,8-bis(hydroxyphenyl)pentadecane having an epoxide equivalent weight of from 400 to 450, obtained as "Cardolite NC514." The reaction mixture was subsequently heated at temperatures maintained within the range of from 120°–130° C. for a period of 4 hours. After cooling, the reaction product obtained was a solid, dark, amber-colored, resinous adduct of diisopropanolamine and the polyglycidyl ether of polymers of 1,8-bis(hydroxyphenyl) pentadecane. This resinous adduct was found to be insoluble in water but it was found to dissolve easily in such volatile organic solvents as xylene, methyl ethyl ketone and ethyl acetate.

EXAMPLE VI

Into a suitably equipped reaction vessel was introduced 100 grams of a low molecular weight styrene/maleic anhydride copolymer containing 23.3 weight percent of maleic anhydride. Thereafter, a charge of 57 grams of a crude distillate of triethylene glycol monobutyl ether containing a minor amount of the higher ethylene glycol butyl ethers was introduced into the reaction vessel. Subsequently, the reaction mixture, thus prepared, was heated to and maintained at a temperature of 200° C. for one hour, the heating being accompanied by intermittent stirring. The melt which formed was poured into a Waring blender having therein a solution composed of 300 grams of water and 20 grams of concentrated ammonium hydroxide while the blender was set to vigorously intersperse the contents therein. After cooling the product, a dispersion in aqueous basic media of a resinous copolymer composed of about 49 weight percent of styrene and about 51 weight percent of 2-[2-(2-butoxyethoxy)ethoxy]ethyl maleate, was found to be clear and viscous. It had a pH of about 7.5 and analysis of a devolatilized sample showed a solids content of 32 percent.

Employing the following procedures, separate portions of the clear, viscous, aqueous, resinous copolymer dispersion, prepared above, were used as the coating vehicle in two different pigmented structural metal primer formulations (Primer I and Primer II).

Primer I (control)

Into 100 parts of the resinous copolymer dispersion of Example VI were admixed 24 parts of a 50 weight percent aqueous emulsion of diglycidyl ether of 4,4'-isopropylidene diphenol having an epoxide equivalent weight within the range of from 172 to 178. Emulsification of the diglycidyl ether was accomplished by blending and ultimately dissolving 2.75 parts of 100 percent nonylphenoxy polyoxyethylene ethanol wax, obtained as "Igepal Co 990" and 0.75 part of 100 percent nonylphenoxy polyethylene ethanol liquid, obtained as "Igepal Co 210" into 100 parts of the diglycidyl ether which was maintained at a temperature of 140° F. Simultaneously, 97 parts of water were being heated to 140° F. Then, the water was added slowly to the hot diglycidyl ether-surfactant mixture while the mixture was being agitated by means of an Eppenbauch mixer.

Next, a prepared pigment paste was blended with the resinous binder, prepared above, in a ratio of 1.5 parts of pigment to 1 part of the resinous binder. The following primer pigment paste formulation was used:

| Ingredients: | Parts by wt. |
| --- | --- |
| "Red Iron Oxide 2060F" [1] | 900 |
| "Barytes W1430" [2] | 2100 |
| Polypropylene glycol having an average molecular weight of 1200 | 15 |
| "Tamol 731" 25% solids [3] | 60 |
| Water | 675 |

[1] "Red Iron Oxide 2060F" has a ferric oxide content of from 58 to 62% and an oil absorption value of 18%.
[2] "Barytes W1430" has a barium sulfate content of 94.2%, it is unbleached and has an oil absorption value of 10.3%.
[3] "Tamol 731" is a sodium salt of a condensed polyelectrolyte containing 25% of non-volatile solids in water.

In order to insure better pigment dispersion throughout the resinous binder vehicle, the formulation was given one pass on a Morehouse mill. Primer I formulation contained about 42 percent of non-volatile solids and had a No. 4 Ford Cup viscosity of 14 seconds.

Primer II

In a similar manner, 38 parts of a 60 weight percent aqueous solution of the diethanolaminediglycidyl ether of 4,4'-isopropylidene diphenol adduct of Example I were blended with 100 parts of a 30.7 weight percent aqueous dispersion of the resinous copolymer of Example VI to prepare a resinous binder vehicle. Subsequently, an experimental batch of the Primer II coating composition was prepared by blending together 1.5 parts of the primer pigment paste formulation for each part of the resinous binder vehicle employed. Primer II formulation contained about 35 percent of non-volatile solids and had a No. 4 Ford Cup viscosity of 33 seconds.

The two cured primer formulations were evaluated as coatings on the surfaces of 4" by 12" "Bonderite 100" bonderized steel panels. A drawdown coating technique was employed using a Meyer wire-wound rod. The primer coatings were air dried for about 2 hours at room temperature followed by a 30-minute cure in an air-circulating oven maintained at a temperature of 350° F.

The dried primer coatings were wet sanded to a film thickness of from 1 to 1.3 mils. The primed panels were then topcoated with a black melamine alkyl topcoating enamel. The topcoat coatings were air dried for 30 minutes at room temperature, followed by a 30-minute oven cure at 250° F.

After conditioning for 4 days at room temperature, the physical properties of the seasoned test panels were evaluated according to accepted standard aqueous coating evaluation procedures. Results of the tests on the aqueous coating systems based on Primer I (Control) and Primer II of the invention showed equally satisfactory performance with regard to properties, such as enamel holdout, glass retention, primer and intercoat adhesion, flexibility, front and reverse impact, water resistance and salt spray resistance. However, a distinctly beneficial and most outstanding characteristic was clearly evident in Primer II of the invention with respect to its storage stability. Primer I (Control) containing the diglycidyl ether of 4,4'-isopropylidene diphenol, as the curing agent, solidified during storage for 4 weeks at 75° F. while in decided contrast Primer II of the invention containing the adduct of diethanolamine and the diglycidyl ether of 4,4'-isopropylidene diphenol, as the curing agent, remained fluid and usable after being submitted to the same shelf-aging test.

EXAMPLE VII

Into 10 grams of a 50 weight percent xylene solution of a copolymer composed of about 75 weight percent of styrene and about 25 weight percent of isooctyl acid maleate were admixed 1.5 grams of the viscous-resinous diethanolamine-diglycidyl ether of 4,4'-isopropylidene diphenol adduct of Example I and 10 grams of methyl ethyl ketone. Films of this coating composition were applied to the solvent cleansed surfaces of a series of tin plated test panels. After air drying for about 0.5 hour, the coatings were further cured by baking in a constant temperature air-circulating oven at 150° C. for 15 minutes. The resultant coatings were shown to have good flexibility and proved to be insoluble when soaked in acetone.

EXAMPLE VIII 23 grams of an epoxidized soybean oil having an average of 4 epoxide groups per triglyceride molecule, a Gardner viscosity of from 3.4 to 3.7 poises at 25° C., a specific gravity of from 0.990 to 0.995 at 25° C., and obtained as "Epoxol 7–4," were introduced into a suitably equipped reaction flask. Then, 10 grams of diethanolamine were admixed with the epoxidized soybean oil and the mixture was heated at a temperature of 200° C. for one hour. The reaction product, when cool, was dark brown in color and viscous.

Subsequently, 100 grams of a styrene/maleic anhydride copolymer having a 22.7 weight percent maleic anhydride content were reacted with 57 grams of a crude distillate of triethylene glycol monobutyl ether containing a minor amount of higher ethylene glycol butyl ethers for a period of 2.5 hours at a temperature of 200° C. Next, 133 grams of the molten copolymer reaction product which was composed of about 49 weight percent of styrene and about 51 weight percent of 2-[2-(2-butoxyethoxy)-ethoxy]ethyl maleate were dissolved in 200 grams of water containing 70 grams of methyl ethyl ketone and 20 grams of concentrated ammonium hydroxide in accordance with practices set forth in Example III. The aqueous copolymer solution, thus obtained, had a non-volatile solids content of 28.6 percent.

To 25 grams of the equeous copolymer solution, prepared immediately above, were admixed 2.75 grams of the diethanolamine-epoxidized soybean oil reaction product. A slightly hazy solution resulted which was cast on a series of "Bonderite 1000" bonderized steel test panels and cured at 150° C. for 20 minutes. The oven-cured clear coating, after cooling to room temperature, was found to be hard and tough, successfully passing 30 inch/pounds of impact on the panel front. It also proved to be insoluble in acetone when soaked therein.

EXAMPLE IX

An iron oxide pigmented coating composition was prepared according to the following formula:

Letdown: Grams
Styrene/butadiene/acrylic acid interpolymer latex dispersed in water (42.4 wt. percent of non-volatile solids [1] _____ 100.0
Adduct of diethanolamine and diglycidyl ether of 4,4'-isopropylidene diphenol (60 wt. percent solids in water) [2] _____ 16.7
Aqueous ammonium hydroxide (28% solution) _____ 3.0

[1] An interpolymer latex composed of about 54 wt. percent of styrene, about 40 wt. percent of butadiene and about 6.0 wt. percent of acrylic acid having a particle size range of from 500–800 angstroms.
[2] An aqueous solution of the reaction product of 1 mole of diglycidyl ether of 4,4'-isopropylidene diphenol having an epoxide equivalent weight of from 172 to 178 and 2 moles of diethanolamine containing 60 wt. percent of non-volatile solids.

A mixture of the above-listed ingredients was used as the binder vehicle for 193 grams of a pigment dispersion having the following composition:

Pigment grind [1] Grams
Red iron oxide _____ 72.0
Barytes _____ 168.0
Dispersant [2] _____ 4.8
Antifoamer [3] _____ 1.2
Water _____ 108.0

[1] The pigment grind was prepared by mixing all of the components and then running the mixture through a Morehouse mill.
[2] "Tamol 731," a sodium salt of a condensed polyelectrolyte containing 25 wt. percent of non-volatile solids in water.
[3] Polypropylene glycol having an average molecular weight of 1200.

The coating composition was prepared by adding the aqueous ammonium hydroxide to the aqueous interpolymer latex dispersion. Then the pigment grind was incorporated with the latex dispersion and finally the aqueous solution of the diethanolamine-diglycidyl ether of 4,4'-isopropylidene diphenol adduct was admixed with the rest of the formulation. The completed pigmented coating composition was allowed to stand for 16 hours at room temperature before using.

The iron oxide pigmented coating composition was applied to a series of cleaned, 4" by 12" "Bonderite 100," bonderized steel test panels with either a Meyer wire-wound film applicator or a spray apparatus. Half of the series of panels were spray coated and the remainder was coated with the film applicator. These films were then dried at room temperature until substantially free of volatile material and subsequently baked for 30 minutes in an air-circulating oven maintained at a temperature of 350° F.

At this stage in the panel finishing operation, a representative number of the spray coated panels and of the film applicator coated panels were submitted to the following physical property tests. As no appreciable difference in the test results was observed due to the coating method employed, an average of the test results on all the filmaceous coatings are assembled hereinafter in Table I.

TABLE I.—PHYSICAL PROPERTIES OF PRIMER COATINGS PRIOR TO TOPCOATING

| Test | Results |
| --- | --- |
| Impact resistance (in./lbs.): | |
| Front | Excellent (>30 in./lbs.). |
| Reverse | Do. |
| Adhesion | Excellent. |
| Sandability | Good. |
| Sprayability | Do. |
| Flexibility (conical mandrel) | No effect. |
| Corrosion protection | Good. |

The remainder of the series of primer coated test panels, that had not been submitted to the above-mentioned physical property tests, were then wet sanded to a dried film thickness of from 1.0 to 1.1 mils. A commercially available black pigmented topcoat enamel of a melamine alkyd composition dissolved in a volatile organic solvent system was applied to some primer coated panels with the same film applicator and to the others with the paint spraying device. The wet topcoatings were then dried at room temperature until substantially free of volatile materials and thereafter baked for 30 minutes at 250° F. Average test results on all of the dual coated panels after aging at room temperature for 4 days are shown in Table II below.

TABLE II

| Test | Results |
| --- | --- |
| Enamel holdout | Excellent. |
| Gloss 60° photovolt | Excellent (100). |
| Impact resistance (in./lbs.): | |
| Front | Excellent (30+ in./lbs.). |
| Reverse | Excellent (24 in./lbs.). |
| Flexibility (conical mandrel) | No failure. |
| Adhesion: | |
| Intercoat | Excellent. |
| Primer | Good to excellent. |
| Water resistance: 250 hrs. at 90°F. (±2° F.) | Unaffected. |
| Salt spray: 250 hrs. in 5% aqueous NaCl solution | Good (1/16 in. creep). |

EXAMPLE X

A primer coating composition was prepared and applied to bonderized steel panels in accordance with the practices set forth in Example IX. The dried primer coats were wet sanded, dried and topcoated in this instance with a commercially available, white pigmented, water-based, acrylic melamine enamel. These topcoatings were air dried until substantially free of volatile materials and subsequently baked at 300° F. for 30 minutes. Tests run on these dual-coated steel test panels after aging 4 hours at room temperature showed the average results in Table III below.

TABLE III

| Test | Results |
| --- | --- |
| Adhesion: | |
| Intercoat | Excellent. |
| Primer | Do. |
| Enamel holdout | Good. |
| Flexibility (conical mandrel) | No failure. |
| Gloss 60° photovolt | Excellent (100). |
| Impact resistance (in./lbs.): | |
| Front | Excellent (>30 in./lbs.). |
| Reverse | Do. |
| Salt spray: 288 hrs. in 5% aqueous NaCl solution | Good (1/16 in. creep). |
| Water resistance: 288 hrs. at 90° F. (±2° F.) | Very slight wrinkling effect which disappears upon removal from water. |

EXAMPLE XI

Part I 270 grams of vinyl acetate and 100 grams of xylene were placed into a reaction flask equipped with means for stirring, a reflux condenser and means for purging the reaction flask and subsequently blanketing the reaction mixture with gaseous nitrogen. The reaction mixture was heated to the reflux temperature of 80° C. Thereafter, a solution containing 90 grams of isooctyl acid maleate, 140 grams of xylene and 5.87 grams of benzoyl peroxide was fed into the reaction mixture at a uniform rate. Addition of the feed solution was accomplished over a period of 2 hours. The temperature of the reaction flask rose gradually to 98° C. by the end of the 2-hour addition of the feed solution. Heating of the reaction mixture was continued for an additional period of 2 hours during which interval the temperature climbed to 112° C. The product solution, containing the vinyl acetate/isooctyl acid maleate copolymer, was clear and colorless. Copolymer solids content of the product solution was determined by means of the vacuum devolatilization of a sample of the solution. The copolymer solids content, thus obtained, was about 56.6 weight percent indicating about 95 percent conversion of the monomers to polymer. The vinyl acetate/isooctyl acid meleate copolymer product was dissolved in methyl ethyl ketone in a sufficient amount to prepare a solution containing 10 weight percent of copolymer solids. The viscosity of the 10 percent solution, as measured at 25° C. was 1.08 centipoises.

Part II

The copolymer product solution of Part I was further diluted with 115 grams of xylene. In due course, to 30 grams of the above diluted xylene solution containing about 43.5 weight percent of vinyl acetate/isooctyl acid maleate copolymer solids were added 8.6 grams of the adduct of diisopropanolamine and the polyglycidyl ether of polymers of 1,8-bis(hydroxyphenyl)pentadecane of Example V and 10 grams of butanol. A film of this copolymer/adduct solution was cast on a tin plate test panel of 10 mils in thickness and baked at 175° C. for 30 minutes. The dried film was thermoset.

EXAMPLE XII

Part I

A glass-lined pressure reactor was charged with 680 grams of vinyl chloride, 184 grams of butyl acrylate, 55 grams of acrylic acid, 605 grams of n-propyl alcohol, 8 grams of methyl ethyl ketone and 1.8 grams of benzoyl peroxide. While the reaction mixture was stirred, the temperature of the reactor was raised to within a range of from 50°–56° C. at an applied pressure of from 52–63 p.s.i. These aforementioned reaction conditions were maintained for about 17 hours. During the succeeding 2 hours, the reaction temperature rose to about 80° C. and remained thereat for a brief period of time. The reaction was terminated at the end of 19 hours. A sample of the viscous product solution was vacuum devolatilized to determine the ternary polymer solids content. The devolatilized sample had a polymer solids content of 34.1 weight percent. The solution viscosity of a 10 weight percent solution of the ternary polymer solution in methyl ethyl ketone, taken at 25° C., was 8.79 centipoises. By means of infrared analysis, the ternary polymer product was shown to contain about 45 weight percent of vinyl chloride, about 45 weight percent of butyl acrylate and about 10 weight percent of acrylic acid.

Part II

To 5 grams of the ternary polymer solution, prepared in Part I, was added 1.75 grams of the adduct of diisopropanolamine and the polyglycidyl ether of polymers of 1,8-bis(hydroxyphenyl)pentadecane of Example V and 4 grams of xylene. The liquid coating composition, thus prepared, was coated on tin plate test panels of 10 mils in thickness and baked at 175° C. for 30 minutes. The cured coating film was found to be insoluble when contacted with methyl ethyl ketone.

EXAMPLE XIII

Part I

A large resin pot equipped with a stirrer, a reflux condenser and water trap, and wherein the reactants were blanketed with nitrogen, was used to prepare three types of alkyd resins. The different monomers and solvent used in each reaction and the gram weight of each material employed are tabulated below in columns A, B and C:

| Monomer | A | B | C |
|---|---|---|---|
| Phthalic anhydride | 596 |  | 740 |
| Glycerin | 371 | 368 | 460 |
| Stearic acid | 458 |  |  |
| Adipic acid |  | 584 |  |
| Lauric acid |  | 322 | 401 |
| Xylene (solvent) | 142 | 127 | 160 |

The reactions were performed at reflux temperature of the mixture of reactants involved with the pot temperature accordingly ranging from about 140° to about 180° C. Samples of the A, B and C resins were removed at various stages of the polymerization reaction in order to obtain resins having varying acid numbers as shown as follows:

| A Samples | Acid No. | B Samples | Acid No. | C Samples | Acid No. |
|---|---|---|---|---|---|
| A1 | 140.5 | B1 | 128 | C1 | 167 |
| A2 | 102.5 | B2 | 73.6 | C2 | 118 |
| A3 | 50.9 |  |  | C3 | 76.8 |
| A4 | 8.2 |  |  | C4 | 49.4 |

Part II

Diethanolamine (DEA)-polyepoxide resin adducts were synthesized by mixing the following amounts in grams of diethanolamine and, in turn, one of each of the three different polyepoxide resins also shown and identified in tabular form immediately below:

| Polyepoxide Resin | X[1] | Y[2] | Z[3] |
|---|---|---|---|
| Polyepoxide Resin, Equivalent Wt. | 140 | 145 | 195 |
| Wt. of Polyepoxide Resin Used (grams) | 50 | 29 | 39 |
| Wt. of DEA Used (grams) | 37.5 | 21 | 21 |
| Amine Equivalent Wt. of Adduct Resin Product | 245 | 250 | 300 |

[1] 3,4-epoxy-6-methylcyclohexylmethyl-3,4-epoxy-6-methylcyclohexane carboxylate, obtained as "Unox 201."
[2] Epoxidized polybutadiene, obtained as "Oxiron 2001."
[3] Polyglycidyl ether of polybutylene glycol, said polybutylene glycol having an average molecular weight of 500.

Each mixture of reactants was heated at 135° C. for 15 minutes, at 175° C. for 15 minutes, and at 60° C. for 40 hours. Resinous adduct products X and Z were soluble in water. Resinous adduct product Y was soluble in dilute acetic acid, a solvent mixture of xylene and n-butyl alcohol, and methyl ethyl ketone.

Part III

Coating solutions, based on the alkyd resins of different acid numbers of Part I and the diethanolamine-polyepoxide resinous adduct products X, Y and Z of Part II, were formulated as follows, the gram weights of ingredients being indicated:

| Alkyd | Alkyd Wt. | Adduct | Adduct Wt. | n-Butyl Alcohol | Xylene |
|---|---|---|---|---|---|
| A1 | 50 | X | 36 | 46 | 0 |
| A2 | 50 | X | 26 | 38 | 0 |
| A3 | 50 | X | 13 | 21 | 42 |
| A4 | 50 | X | 2.2 | 17 | 35 |
| B1 | 25 | X | 14 | 20 | 0 |
| B2 | 25 | X | 8.0 | 11 | 21 |
| C1 | 25 | X | 18 | 25 | 0 |
| C2 | 25 | X | 13 | 20 | 0 |
| C3 | 25 | X | 8.3 | 13 | 27 |
| C4 | 25 | X | 5.4 | 12 | 24 |
| C3 | 25 | Y | 8.5 | 13 | 27 |
| C3 | 25 | Z | 10.3 | 13 | 27 |
| C3 | 25 | Z | 10.3 | (1) | 0 |

[1] 25 grams of alkyd C3 and 10.3 grams of adduct resin product Z were dissolved in 40 grams of water containing 10 grams of concentrated ammonium hydroxide.

These above-described coating solutions were cast on 10 mil tin plate test panels, air dried for about 1 hour and subsequently baked in an air-circulating oven maintained at temperatures within the range of from 175° to 200° C. The coating, based on Alkyd A4 and the resinous adduct of 3,4-epoxy-6-methylcyclohexyl-methyl-3,4-epoxy-6-methylcyclohexane carboxylate and diethanolamine, did not cure, whereas all of the other coatings in the group were found to be thermoset.

The thermosettable coating vehicles of the present invention may, as set forth hereinbefore, be employed as clear coatings, i.e. non-pigmented coatings, or as pigmented coatings. If pigmented, the ratio of pigments to coating vehicle solids may be varied widely, depending on the pigment employed and the specific application involved. Thus, the ratio of pigment to coating vehicle solids may vary from 0.5 to 1 to 4 to 1.

A wide variety of pigments can be employed with the novel, thermosettable coating vehicles of the present invention. The pigments employed, however, must be stable and non-reactive under alkaline conditions, i.e. a pH over 8. Typical pigments which are suitable include titanium dioxide, iron oxide, calcium carbonate, barytes and numerous types of clays.

The thermosettable coating compositions of the present invention may be applied by spraying, brushing, dipping, by rollers, or in any other suitable way. The concentration may be varied depending upon the manner of application, the substrate to which the coating is applied, and the thickness of the coating desired. In general, the concentration may vary from 20 to 60 weight percent of non-volatile solids. In most applications, the preferred concentration is from 40 to 60, and preferably about 55, weight percent of non-volatile solids.

It is essential that films of the thermosettable coating compositions of the invention be baked at elevated temperature. A preferred embodiment involves applying the clear or pigmented coating composition to the substrate and allowing the coated substrate to air dry at room or slightly elevated temperature. The air drying cycle should be continued until the film is substantially free of solvent. The baking or curing operation is required for at least two reasons. The baking operation volatilizes any volatile material present, including water. The baking operation effects a chemical reaction which is believed to be an esterification or an amidation of the free-carboxyl groups of the acidic polymeric material and which insolubilizes the entire film. Depending on the specific coating composition being used, the baking temperature may vary from 250° F. to about 400° F. Baking or curing times may vary from about 45 minutes at the lower temperature to about 5 minutes at the higher temperatures. A preferred schedule is 30 minutes at 300° to 350° F.

The novel, shelf-stable, thermosetting coating compositions of the invention can be applied to any substrate, such as aluminum, brass, steel, tin, copper or other metals, and alloys thereof, as well as glass, stone, concrete, cement including asbestos cement products and the like, which will withstand the baking temperatures required to satisfactorily cure a film of the instant coating compositions. However, these improved coating compositions find particular utility when employed as pigmented primer coatings for application over the exposed surfaces of structural metal articles, such as on those used in the automotive industry, on appliances manufactured for domestic and industrial use, on furniture either partially or totally constructed of structural metal, on cabinets for housing heating and air conditioning equipment and the like.

Accordingly, it is to be understood that changes and variations may be made without departing from the spirit and scope of the invention as defined in the appended claims.

What is claimed is:

1. A heat-convertible, thermosettable, liquid coating vehicle comprising a mixture of (1) a homogeneous dispersion in a volatile solvent of at least one organic, polycarboxylic, polymeric material having available therein up to 1 gram equivalent weight of at least one reactive carboxylic substituent group per 100 grams of solids of said polymeric material, having an acid number from 20 to 175, and wherein from 4 to 55 weight percent of said polymeric material is composed of a polymerized organic acidic monomer selected from the group consisting of (I) ethylenically unsaturated monocarboxylic acids; (II) ethylenically unsaturated polycarboxylic acids; (III) partial esters of α,β-ethylenically unsaturated dicarboxylic acids with $C_1$ to $C_{20}$ primary and secondary alcohols; (IV) partial amides of α,β-ethylenically unsaturated dicarboxylic acids with $C_1$ to $C_{18}$ primary and secondary amines; (V) partial esters of α,β-ethylenically unsaturated dicarboxylic anhydrides; and (VI) partial esters of α,β-ethylenically unsaturated dicarboxylic acid with $C_1$ to $C_{20}$ primary and secondary monoalcohols having from 1 to about 9 ether oxygen linkages having available therein up to 1 gram equivalent weight of at least one reactive carboxylic substituent group and wherein the remainder of said organic polymeric material is composed of at least one additional polymerized organic monomer selected from the group consisting of (A) $C_1$ to $C_8$ primary and secondary alkyl esters of acrylic acid; (B) $C_1$ to $C_8$ primary and secondary alkyl esters of methacrylic acid; (C) acrylonitrile; (D) methacrylonitrile; (E) open-chain aliphatic conjugated dienes having from 4 to 9 carbon atoms; (F) vinyl chloride; (G) vinylidene chloride; (H) vinyl esters of monocarboxylic organic acids having from 2 to 4 carbon atoms in the acid substituent group; and (I) monoalkenyl aromatic hydrocarbons of the benzene series characterized by the general formula:

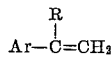

wherein Ar, selected independently, represents an aromatic hydrocarbon and a nuclear halohydrocarbon radical and R is a substituent selected from the group consisting of hydrogen, a $C_1$ to $C_4$ alkyl radical, and a halogen radical having an atomic number of from 17 to 35 inclusively, with (2) a soluble, resinous polyepoxide-alkanolamine adduct which is the reaction product of 0.7 to 1.5 mole of a volatile alkanolamine selected from the group consisting of monoethanolamine, diethanolamine, monoisopropanolamine and diisopropanolamine and 1 equivalent weight of a polyepoxide resin having an epoxide equivalent weight of less than 1000, the ratio of (2) to (1) being from 0.2 to 2.0 amine equivalent weights per equivalent weight of said reactive carboxylic substituent group of said polymeric material.

2. The coating vehicle of claim 1, wherein said polyepoxide resin is a polyglycidyl ether of polymers of 1,8-bis(hydroxyphenyl)pentadecane.

3. The coating vehicle of claim 1, wherein said polyepoxide resin is the diglycidyl ether of 4,4'-isopropylidene diphenol having an epoxide equivalent weight from 172 to 178.

4. The coating vehicle of claim 1, wherein said polyepoxide resin is epoxidized soybean oil having an average of 4 epoxide groups per triglyceride molecule.

5. The coating vehicle of claim 1, wherein said polyepoxide resin is 3,4 epoxy-6-methylcyclohexylmethyl-3,4-epoxy-6-methylcyclohexane carboxylate having an epoxide equivalent weight of about 140.

6. The coating vehicle of claim 1, wherein said polyepoxide resin is epoxidized polybutadiene.

7. The coating vehicle of claim 1, wherein said polyepoxide resin is a polyglycidyl ether of polybutylene glycol.

8. The coating vehicle of claim 1, wherein said homogeneous dispersion of organic polycarboxylic polymeric material is an organic solvent solution containing about 50 weight percent of polymeric solids composed of about 75 weight percent of polymerized styrene and about 25 weight percent of polymerized isooctyl acid maleate and wherein said polyepoxidealkanolamine adduct is the reaction product of 1 mole of diethanolamine and 1 equivalent weight of the diglycidyl ether of 4,4'-isopropylidene diphenol having an epoxide equivalent weight of from 172 to 178.

9. The coating vehicle of claim 1, wherein said homogeneous dispersion of organic polymeric material is an organic solvent solution containing about 56.6 weight percent of polymeric solids composed of about 75 weight percent of polymerized vinyl acetate and about 25 weight percent of polymerized isooctyl acid maleate and wherein said polyepoxide-alkanolamine adduct is the reaction product of 1 mole of diisopropanolamine and 1 equivalent weight of the polyglycidyl ether of polymers of 1,8-bis(hydroxyphenyl)pentadecane.

10. The coating vehicle of claim 1, wherein said homogeneous dispersion of organic polycarboxylic polymeric material is an organic solvent solution containing about 34 weight percent of polymeric solids composed of about 45 weight percent of polymerized vinyl chloride, about 45 weight percent of polymerized butyl acrylate and about 10 weight percent of polymerized acrylic acid, and wherein said polyepoxide-alkanolamine adduct is the reaction product of 1 mole of diisopropanolamine and 1 equivalent weight of the polyglycidyl ether of polymers of 1,8-bis(hydroxyphenyl)pentadecane.

11. The coating vehicle of claim 1, wherein said volatile solvent is at least one organic solvent selected from the group consisting of xylene, methyl ethyl ketone, ethyl acetate, butyl alcohol, propyl alcohol, blends of xylene and butyl alcohol, blends of xylene and propyl alcohol, and blends of xylene and methyl ethyl ketone.

12. The coating vehicle of claim 1 wherein said mixture comprises (1) a homogeneous dispersion in an aqueous solvent of said organic polycarboxylic polymeric material with (2) said polyepoxide-alkanolamine adduct composed of from 0.7 to 1.5 moles of an alkanolamine selected from the group consisting of monoethanolamine and diethanolamine and 1 equivalent weight of a polyepoxide resin having an epoxide equivalent weight of less than 250, the ratio of (2) to (1) being from 0.2 to 2.0 amine equivalent weights per equivalent weight of said reactive carboxylic substituent group of said polymeric material.

13. The water-borne coating vehicle of claim 12, wherein said polyepoxide is the diglycidyl ether of 4,4'-isopropylidene diphenol having an epoxide equivalent weight of from 172 to 178.

14. The water-borne coating vehicle of claim 12, wherein said polyepoxide is an epoxidized soybean oil having an average of 4 epoxide groups per triglyceride molecule.

15. The coating vehicle of claim 12, wherein said polyepoxide resin is 3,4-epoxy-6-methylcyclohexylmethyl-3,4-epoxy-6-methylcyclohexane carboxylate having an epoxide equivalent weight of about 140.

16. The coating vehicle of claim 12, wherein said polyepoxide resin is polyglycidyl ether of polybutylene glycol.

17. The coating vehicle of claim 12, wherein said aqueous solvent is selected from the group consisting of water, dilute aqueous acetic acid, and dilute aqueous ammonium hydroxide.

18. The water-borne coating vehicle of claim 12, wherein said homogeneous dispersion of at least one water-insoluble organic polycarboxylic polymeric material is an aqueous dispersion containing about 42 weight percent of water-insoluble copolymer solids composed of about 54 weight percent of polymerized styrene, about 40 weight percent of polymerized butadiene and about 6.0 weight percent of polymerized acrylic acid.

19. A heat convertible, thermosettable, liquid coating vehicle comprising a mixture of (1) a homogeneous dispersion in a volatile solvent of at least one polyester having available therein up to 1 gram equivalent weight of at least one reactive carboxylic substituent group per 100 grams of solids of said polyester and having an acid number from 20 to 175 and wherein said polyester is composed of at least 1 mole (A) a polymerized organic acid monomer selected from the group consisting of (I) saturated aliphatic polycarboxylic acids; (II) aliphatic monocarboxylic acids; (III) ethylenically unsaturated polycarboxylic acid anhydrides; and (IV) ethylenically unsaturated polycarboxylic anhydrides, and not in excess of 1 mole of (B) a $C_2$ to $C_{18}$ saturated polyhydric alcohol with (2) a soluble, resinous polyepoxide-alkanolamine adduct which is the reaction product of 0.7 to 1.5 mole of a volatile alkanolamine selected from the group consisting of monoethanolamine, diethanolamine, monoisopropanolamine and diisopropanolamine and 1 equivalent weight of a polyepoxide resin having an epoxide equivalent weight of less than 1000, the ratio of (2) to (1) being from 0.2 to 2.0 amine equivalent weights per equivalent weight of said reactive carboxylic substituent group of said polyester.

20. The coating vehicle of claim 19, wherein said saturated polyhydric alcohol is glycerin.

21. The coating vehicle of claim 19, wherein said polymerized organic acidic monomer is composed of about 1 mole of phthalic anhydride and about 0.4 mole of stearic acid.

22. The coating vehicle of claim 19, wherein said polymerized organic acidic monomer is composed of about 1 mole of adipic acid and about 0.4 mole of lauric acid.

23. The coating vehicle of claim 19, wherein said polymerized organic acidic monomer is composed of about 1 mole of phthalic anhydride and about 0.4 mole of lauric acid.

24. A composite article comprising a substrate of a structural material capable of withstanding high temperatures having on the surface thereof a cured finish of the heat-convertible, thermosettable, liquid coating vehicle of claim 1.

25. A composite article comprising a structural metal substrate having on the surface thereof a cured finish of a pigment formulated heat-convertible, thermosettable, liquid coating vehicle of claim 12.

26. A composite article comprising a structural metal substrate having on the surface thereof a cured finish of the heat-convertible, thermosettable, liquid coating vehicle of claim 19.

References Cited

UNITED STATES PATENTS

| | | | |
|---|---|---|---|
| 2,820,802 | 1/1958 | Sprang | 260—31.6 |
| 2,829,984 | 4/1958 | Yaeger | 260—47 |
| 2,890,197 | 6/1959 | Phillips | 260—835 |
| 2,947,338 | 8/1960 | Reid | 260—29.6 |
| 3,035,923 | 3/1962 | Geisler | 260—404.8 |
| 3,057,812 | 10/1962 | Straughan | 260—29.6 |
| 3,073,796 | 1/1963 | Reich | 260—835 |

FOREIGN PATENTS

| | | |
|---|---|---|
| 663,841 | 12/1951 | Great Britain. |
| 839,825 | 6/1960 | Great Britain. |

MURRAY TILLMAN, *Primary Examiner.*

P. LIEBERMAN, *Assistant Examiner.*